(12) United States Patent
Saito

(10) Patent No.: US 7,378,220 B2
(45) Date of Patent: *May 27, 2008

(54) OPTICAL INFORMATION RECORDING METHOD AND MEDIUM

(75) Inventor: Naoki Saito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 272 days.

This patent is subject to a terminal disclaimer.

(21) Appl. No.: 10/180,099

(22) Filed: Jun. 27, 2002

(65) Prior Publication Data

US 2003/0138728 A1    Jul. 24, 2003

(30) Foreign Application Priority Data

Jun. 28, 2001    (JP)    ............................. 2001-196958

(51) Int. Cl.
    *G11B 7/24*    (2006.01)
(52) U.S. Cl. ................ 430/270.16; 430/945; 428/64.8; 369/284; 369/288
(58) Field of Classification Search ........... 430/270.16, 430/945; 369/288, 283
    See application file for complete search history.

(56) References Cited

U.S. PATENT DOCUMENTS

| | | | | |
|---|---|---|---|---|
| 2,953,574 | A * | 9/1960 | Martin ........................ 540/131 |
| 4,241,355 | A * | 12/1980 | Bloom et al. ............ 346/135.1 |
| 4,412,231 | A * | 10/1983 | Namba et al. ........... 346/135.1 |
| 4,946,762 | A | 8/1990 | Albert et al. .......... 430/270.16 |
| 5,024,926 | A * | 6/1991 | Itoh et al. ................. 430/495.1 |
| 5,248,538 | A * | 9/1993 | Kovacs et al. ............ 428/64.8 |
| 5,424,171 | A * | 6/1995 | Yanagisawa et al. .. 430/270.16 |
| 5,633,106 | A * | 5/1997 | Aihara et al. .................. 430/21 |
| 5,776,656 | A * | 7/1998 | Shinkai et al. ......... 430/270.19 |
| 6,045,971 | A * | 4/2000 | Yashiro ................. 430/270.16 |
| 6,087,492 | A * | 7/2000 | Wolleb ........................ 540/139 |
| 6,400,655 | B1 * | 6/2002 | Kim ......................... 369/13.33 |
| 6,661,770 | B2 * | 12/2003 | Kakuta et al. ............ 369/275.4 |
| 6,699,591 | B2 * | 3/2004 | Ishida et al. ................. 428/641 |
| 2003/0118938 | A1 * | 6/2003 | Ishida et al. ........... 430/270.16 |
| 2003/0206514 | A1 * | 11/2003 | Noguchi et al. ............ 369/288 |
| 2004/0125739 | A1 * | 7/2004 | Usami et al. ............. 369/275.5 |
| 2005/0106352 | A1 * | 5/2005 | Watanabe et al. .......... 428/64.4 |
| 2005/0233104 | A1 * | 10/2005 | Saito ........................ 428/64.4 |
| 2006/0105270 | A1 * | 5/2006 | Saito ..................... 430/270.16 |

FOREIGN PATENT DOCUMENTS

| | | | |
|---|---|---|---|
| EP | 0 204 876 | A1 | 12/1986 |
| EP | 0 373 939 | A1 | 6/1990 |
| EP | 0 414 966 | A1 | 3/1991 |
| EP | 1039449 | * | 9/2000 |
| EP | 1 103 962 | A2 | 5/2001 |
| JP | 63-189291 | A | 8/1988 |
| JP | 63-307987 | A | 12/1988 |
| JP | 01-133790 | A | 5/1989 |
| JP | 01-198391 | A | 8/1989 |
| JP | 01-210388 | A | 8/1989 |
| JP | 04-073188 | A | 3/1992 |
| JP | 04-074691 | A | 3/1992 |
| JP | 04-097889 | A | 3/1992 |
| JP | 04-113886 | A | 4/1992 |
| JP | 05-069673 | A | 3/1993 |
| JP | 05-096861 | A | 4/1993 |
| JP | 05-266512 | * | 10/1993 |
| JP | 06-048045 | A | 2/1994 |
| JP | 06-251417 | * | 9/1994 |
| JP | 06-320868 | A | 11/1994 |
| JP | 07-257037 | A | 10/1995 |
| JP | 07-266703 | A | 10/1995 |
| JP | 07-268227 | A | 10/1995 |
| JP | 07-304257 | * | 11/1995 |
| JP | 07-314897 | A | 12/1995 |
| JP | 07-334863 | A | 12/1995 |
| JP | 08-090922 | A | 4/1996 |
| JP | 09-315002 | A | 12/1997 |
| JP | 10-000856 | A | 1/1998 |
| JP | 10-116443 | A | 5/1998 |
| JP | 11-138993 | A | 5/1999 |
| JP | 2001-232944 | A | 8/2001 |

OTHER PUBLICATIONS

Oksengendler et al., "Trifluoromethylthio and trifluoromethylsulfonyl-substituted phthalocyanine", Zhur. Organicheskoi Khimii, vol. 14(5) pp. 1046-1051 (1978).*
Moser et al., 'Phthalocyanine compounds', (1963) pp. 28-37.*
Machine translation of JP 07-268227.*
Japanese Abstract No. 05127303, dated May 25, 1993.
Japanese Office Action dated Jan. 30, 2007.
Japanese Patent office rejection Aug. 2005.
Japanese Office Action dated Nov. 30, 2007.

* cited by examiner

*Primary Examiner*—Martin Angebranndt
(74) *Attorney, Agent, or Firm*—Sughrue Mion, PLLC

(57) ABSTRACT

An optical information recording medium includes a substrate having disposed thereon a recording layer that is recordable by irradiating the recording layer with a laser having a wavelength of 450 nm or less. The recording layer contains a specific phthalocyanine derivative. An optical information recording method uses the medium.

13 Claims, No Drawings

OPTICAL INFORMATION RECORDING METHOD AND MEDIUM

BACKGROUND OF THE INVENTION

1. Field of the Invention

The present invention relates to an optical information recording method, in which information is recorded and played back with a laser, and to an optical information recording medium used in the method. In particular, the invention relates to a heat-mode optical information recording medium on which information is recorded by irradiating the medium with a shortwave laser having a wavelength of 450 nm or shorter, and to an optical information recording method using the medium.

2. Description of the Related Art

A CD-R is a writable, optical information recording medium (optical disc) on which information can be written only once by irradiation with a laser, and has conventionally been known. A CD-R typically comprises a transparent disc substrate having successively disposed thereon a recording layer including an organic dye, a reflective layer including metal such as gold, and a protective layer made of resin. Information is recorded on the CD-R by irradiating the disc with a near infrared laser (i.e., a laser generally having a wavelength of around 780 nm). Specifically, the portion of the dye recording layer that is irradiated absorbs light, whereby temperature increases at the irradiated portion. The increase in temperature produces a physical or chemical change (e.g., formation of pits) to thereby alter the optical characteristics of the irradiated portion, whereby information is recorded. The information thus recorded on the optical disc is ordinarily read (played back) by irradiating the optical disc with a laser having the same wavelength as that of the laser used to record the information and detecting a difference in reflectance between the region of the dye recording layer whose optical characteristics have been changed (recorded portion) and the region of the dye recording layer whose optical characteristics have not been changed (unrecorded portion).

In recent years, there has been a demand for optical information recording media having higher recording density. In response to this demand, digital versatile disc-recordable discs (DVD-Rs) have been proposed (e.g., see the supplemental issue of *Nikkei New Media* entitled "DVD", 1995). DVD-Rs include a transparent disc substrate disposed with a guide groove (pre-groove) for tracking irradiated laser light and having a width that is equal to or less than half (0.74 to 0.8 μm) the width of the pre-groove of a CD-R. DVD-Rs typically comprise two such transparent disc substrates that each have successively disposed thereon a dye recording layer, a reflective layer, and, if needed, a resin protective layer, with the discs being adhered together so that the recording layers face inward. DVD-Rs may also comprise one such transparent disc substrate (disposed with the aforementioned layers) adhered together with a protective substrate having the same disc shape as the transparent disc substrate, with the recording layer similarly facing inward. Information is recorded onto or played back from the DVD-R by irradiating the DVD-R with a visible laser (ordinarily having a wavelength of 630 nm to 680 nm), and it is possible to record at a higher density than a CD-R.

Recently, high-vision television and networks such as the Internet have rapidly become more widespread. In addition, with the start of HDTV (High Definition Television) broadcasting being near at hand, the demand for large-capacity optical recording media capable of recording visual information easily and inexpensively is rising. While DVD-Rs have to a certain extent secured a position as large-capacity recording media, they still do not possess a sufficiently large recording capacity to meet the demands of the future. For this reason, development of optical discs in which recording density is improved by using shortwave lasers and that have even greater storage capacity continues to advance. For example, Japanese Patent Application Laid-Open (JP-A) Nos. 4-74690, 7-304256, 7-304257, 8-127174, 11-53758, 11-334204, 11-334205, 11-334206, 11-334207, 2000-43423, 2000-108513, 2000-113504, 2000-149320, 2000-158818, and 2000-228028 disclose methods for recording information on and playing back information from optical recording media including an organic dye recording layer by irradiating the recording layer with a laser having a wavelength of 530 nm or less. These methods specifically propose irradiating, with a blue (wavelength of 430 nm or 488 nm) or blue-green laser (wavelength of 515 nm) laser, optical discs including a recording layer comprising a dye such as a porphyrin compound, an azo dye, a metallic azo dye, a quinophthalone dye, a trimethynecyanine dye, a dicyanovinylphenyl skeleton dye, a coumalin compound, and a naphthalocyanine compound.

Also, in view of compatibility with existing CD-R systems, optical information recording media with which it is possible to record and play back information using lasers in mutually different wavelength regions have been proposed. For example, JP-A Nos. 2000-141900, 2000-158816, 2000-185471, 2000-289342, and 2000-309165 propose recording media with which it is possible to record and play back information with any laser by mixing dyes used in CD-Rs and dyes used in DVD-Rs together.

However, the present inventors have ascertained that further improvement is needed because, when information is recorded on the above-described conventional optical discs by irradiating the discs with a shortwave laser having a wavelength of 450 nm or less, recording characteristics, such as reflectance and percentage modulation, are not satisfactory and storage stability is insufficient. In particular, recording characteristics of the above-described optical discs drop when the discs are irradiated with a laser having a wavelength in the vicinity of 405 nm.

SUMMARY OF THE INVENTION

The present invention was devised to eliminate the above-described problems in the prior art.

It is an object of the present invention to provide an optical information recording method and a medium used therein, with which information can be recorded and played back by irradiating the medium with a shortwave laser having a wavelength of 450 nm, and in particular a highly versatile semiconductor laser having a wavelength in the vicinity of 405 nm, and that exhibit excellent recording characteristics.

It is a second object of the invention to provide an optical information recording method and medium used therein, in which information recorded on the medium can be stored over a long period of time by designing a recording layer that is stable with respect to high temperature and high humidity.

It is a third object of the invention to provide a highly versatile optical information recording method and medium used therein, with which information can be recorded and played back by irradiating the medium with both a shortwave laser having a wavelength of 450 nm or less and a laser having a wavelength of 750 to 850 nm that is used in a conventional CD-R.

It is a fourth object of the invention to provide an optical information recording method and a medium used therein, in which information can be recorded by irradiating the medium with either a laser having a wavelength of 450 nm or a laser having a wavelength of 750 to 850 nm.

The above objects are achieved by aspects of the invention described below.

A first aspect of the invention is a method of recording information on an optical information recording medium by irradiating the medium with a laser having a wavelength no greater than 450 nm, wherein a recording layer of the optical information recording medium contains a phthalocyanine derivative.

A second aspect of the invention is an optical information recording medium that is used in the optical information recording method.

A third aspect of the invention is an optical information recording medium used in a method of recording information by irradiating the medium with a laser having a wavelength no greater than 450 nm, wherein a recording layer of the optical information recording medium contains a phthalocyanine derivative having a substituent at an α-position thereof. The phthalocyanine derivative has a main absorption band of around 700 nm and a sub-absorption band of around 340 nm. By using the phthalocyanine derivative as the recording material for the recording layer, an optical information recording medium that has high sensitivity to a laser having a short wavelength of 450 nm or less, good recording and playback characteristics, high reflectance, and high percentage modulation is obtained. The optical information recording medium also has high sensitivity to a laser having a wavelength of 750 to 850 nm, good recording and playback characteristics, high reflectance, and high percentage modulation.

It is preferable to use the phthalocyanine derivative represented by general formula (I) in the recording layer.

General formula (I)

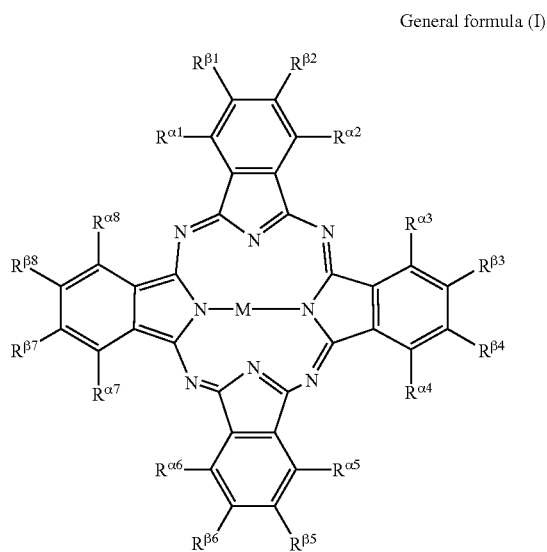

wherein $R^{\alpha 1}$ to $R^{\alpha 8}$ and $R^{\beta 1}$ to $R^{\beta 8}$ each independently represents one selected from the group consisting of a hydrogen atom, a halogen atom, a cyano group, a nitro group, a formyl group, a carboxyl group, a sulfo group, an alkyl group having 1 to 20 carbon atoms, an aryl group having 6 to 14 carbon atoms, an aralkyl group having 7 to 15 carbon atoms, a heterocyclic group having 1 to 10 carbon atoms, an alkoxy group having 1 to 20 carbon atoms, an aryloxy group having 6 to 14 carbon atoms, an acyl group having 2 to 21 carbon atoms, an alkylsulfonyl group having 1 to 20 carbon atoms, an arylsulfonyl group having 6 to 14 carbon atoms, an aralkylsulfonyl group having 7 to 15 carbon atoms, a heterylsulfonyl group having 1 to 10 carbon atoms, a carbamoyl group having 1 to 25 carbon atoms, a sulfamoyl group having 0 to 32 carbon atoms, an alkoxycarbonyl group having 2 to 21 carbon atoms, an aryloxycarbonyl group having 7 to 15 carbon atoms, an acylamino group having 2 to 21 carbon atoms, a sulfonylamino group having 1 to 20 carbon atoms, and an amino group having 0 to 36 carbon atoms; and M represents two hydrogen atoms, a metal, a metal oxide, or a metal having a ligand.

The optical information recording medium of the present invention also preferably includes a reflective layer of metal disposed on the recording layer, and more preferably also includes a protective layer disposed on the recording layer. Preferably, a pre-groove having a track pitch of 0.2 to 0.5 μm is formed on the surface of the substrate disposed with the recording layer.

In order to achieve the fourth object, the optical information recording method of the invention records information on the optical information recording medium by irradiating the medium with a laser having a wavelength of 450 nm or less or a laser light having a wavelength of 750 to 850 nm. Since the recording layer of the medium includes the phthalocyanine derivative having a main absorption band of around 700 nm and a sub-absorption band of around 340 nm, information can be recorded by selectively irradiating either the laser light having a wavelength of 450 nm or less or the laser light having a wavelength of 750 to 850 nm.

DESCRIPTION OF THE PREFERRED EMBODIMENTS

Optical Information Recording Method

In an optical information recording method of the present invention, a light beam for recording (e.g., a semiconductor laser) is irradiated onto an optical information recording medium disposed with a recording layer while the medium is rotated at a constant linear velocity (in the case of a CD, at 1.2 to 1.4 m/sec) or at a constant angular velocity. By irradiating the medium with light, the recording layer absorbs the light, which produces a local increase in temperature, whereby optical characteristics of the recording layer change as a result of physical or chemical changes (e.g., formation of pits) and information is recorded. In the invention, a semiconductor laser light having an oscillation wavelength ranging from 390 to 450 nm is used as the recording light. Examples of preferable light sources include a bluish-purple semiconductor laser having an oscillation wavelength ranging from 390 to 415 nm and a bluish-purple SHG laser having a central oscillation wavelength of 405 to 425 nm obtained by halving the wavelength of an infrared semiconductor laser, whose central oscillation wavelength is 850 nm, using a optical waveguide element. The bluish-purple semiconductor laser is particularly preferable in terms of recording density. Recorded information can be played back by irradiating the medium with the semiconductor laser while rotating the medium at the same constant linear velocity as mentioned above and detecting the reflected light.

Optical Information Recording Medium

An optical information recording medium of the present invention (hereinafter, sometimes referred to simply as "the medium") is used in the above-described method. The medium includes a recording layer that contains a phthalocyanine derivative.

The phthalocyanine derivative has a main absorption band of around 700 nm and a sub-absorption band of around 340 nm. By using the phthalocyanine derivative as recording material of the recording layer, it is possible to obtain an optical information recording medium that has excellent recording/playback characteristics and has high reflectance and high percentage modulation even with respect to a shortwave laser having a wavelength of 450 nm or less.

Moreover, the medium also has good recording/playback characteristics and high reflectance and high percentage modulation even with respect to a laser having wavelength of 750 to 850 nm.

Because the phthalocyanine derivative has a specific substituent, the phthalocyanine derivative forms an amorphous phase that is stable thermodynamically. Therefore, there is no occurrence of phase transition, such as crystallization of the recording layer, when the medium is stored. Accordingly, the present invention has excellent storage stability.

Hereinafter, an embodiment of the optical information recording medium of the present invention will be described in detail.

The phthalocyanine derivative used in the medium of the invention is preferably a compound represented by the following general formula (I).

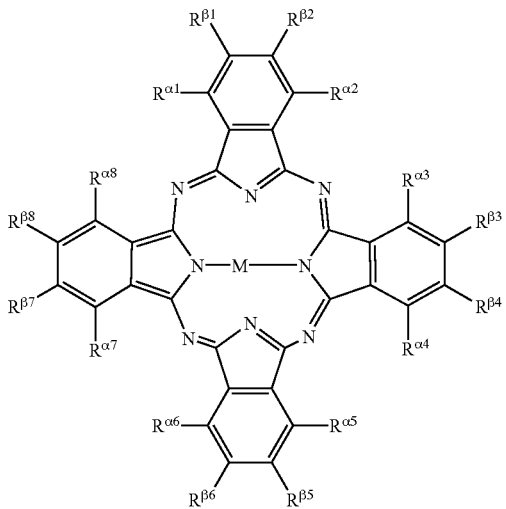

General formula (I)

wherein $R^{\alpha 1}$ to $R^{\alpha 8}$ and $R^{\beta 1}$ to $R^{\beta 8}$ each independently represents one selected from the group consisting of a hydrogen atom, a halogen atom, a cyano group, a nitro group, a formyl group, a carboxyl group, a sulfo group, an alkyl group having 1 to 20 carbon atoms, an aryl group having 6 to 14 carbon atoms, an aralkyl group having 7 to 15 carbon atoms, a heterocyclic group having 1 to 10 carbon atoms, an alkoxy group having 1 to 20 carbon atoms, an aryloxy group having 6 to 14 carbon atoms, an acyl group having 2 to 21 carbon atoms, an alkylsulfonyl group having 1 to 20 carbon atoms, an arylsulfonyl group having 6 to 14 carbon atoms, an aralkylsulfonyl group having 7 to 15 carbon atoms, a heterylsulfonyl group having 1 to 10 carbon atoms, a carbamoyl group having 1 to 25 carbon atoms, a sulfamoyl group having 0 to 32 carbon atoms, an alkoxycarbonyl group having 2 to 21 carbon atoms, an aryloxycarbonyl group having 7 to 15 carbon atoms, an acylamino group having 2 to 21 carbon atoms, a sulfonylamino group having 1 to 20 carbon atoms, and an amino group having 0 to 36 carbon atoms; and M represents two hydrogen atoms, a metal, a metal oxide, or a metal having a ligand.

In general formula (I), all of $R^{\alpha 1}$ to $R^{\alpha 8}$ are preferably not simultaneously hydrogen atoms; further, at least four of the substituents, namely, $R^{\alpha 1}$ or $R^{\alpha 2}$, $R^{\alpha 3}$ or $R^{\alpha 4}$, $R^{\alpha 5}$ or $R^{\alpha 6}$, and $R^{\alpha 7}$ or $R^{\alpha 8}$, are simultaneously hydrogen atoms. And all of $R^{\beta 1}$ to $R^{\beta 8}$ in the general formula (I) are preferably simultaneously hydrogen atoms.

In general formula (I), preferable examples of $R^{\alpha 1}$ to $R^{\alpha 8}$ and $R^{\beta 1}$ to $R^{\beta 8}$ are a hydrogen atom, a halogen atom, a carboxyl group, a sulfo group, an alkyl group having 1 to 16 carbon atoms, an aryl group having 6 to 10 carbon atoms, an alkoxy group having 1 to 16 carbon atoms, an aryloxy group having 6 to 10 carbon atoms, an alkylsulfonyl group having 1 to 16 carbon atoms, an arylsulfonyl group having 6 to 14 carbon atoms, an aralkylsulfonyl group having 7 to 15 carbon atoms, a heterylsulfonyl group having 1 to 8 carbon atoms, a sulfamoyl group having 2 to 20 carbon atoms, an alkoxycarbonyl group having 2 to 17 carbon atoms, an aryloxycarbonyl group having 7 to 11 carbon atoms, an acylamino group having 2 to 18 carbon atoms, and a sulfonylamino group having 1 to 18 carbon atoms. More preferable examples are a hydrogen atom, a halogen atom, a carboxyl group, a sulfo group, an alkoxy group having 1 to 16 carbon atoms, an aryloxy group having 6 to 10 carbon atoms, an alkylsulfonyl group having 1 to 14 carbon atoms, an arylsulfonyl group having 6 to 10 carbon atoms, an aralkylsulfonyl group having 7 to 11 carbon atoms, a heterylsulfonyl group having 1 to 8 carbon atoms, a sulfamoyl group having 2 to 16 carbon atoms, an alkoxycarbonyl group having 2 to 13 carbon atoms, an acylamino group having 2 to 14 carbon atoms, and a sulfonylamino group having 1 to 14 carbon atoms. Even more preferable examples of $R^{\alpha 1}$ to $R^{\alpha 8}$ are a hydrogen atom, a halogen atom, a sulfo group, an alkoxy group having 8 to 16 carbon atoms, an alkylsulfonyl group having 1 to 12 carbon atoms, an arylsulfonyl group having 6 to 10 carbon atoms, an aralkylsulfonyl group having 7 to 11 carbon atoms, a sulfamoyl group having 1 to 12 carbon atoms, an acylamino group having 2 to 12 carbon atoms, or a sulfonylamino group having 1 to 12 carbon atoms. Even more preferable examples of $R^{\beta 1}$ to $R^{\beta 8}$ are a hydrogen atom and a halogen atom. Most preferably at least one of $R^{\alpha 1}$ to $R^{\alpha 2}$ are a sulfo group, an alkylsulfonyl group having 1 to 10 carbon atoms, a phenylsulfonyl group, a benzylsulfonyl group or a sulfamoyl group having 1 to 10 carbon atoms, with $R^{\beta 1}$ to $R^{\beta 8}$ being a hydrogen atom.

In general formula (I), $R^{\alpha 1}$ to $R^{\alpha 8}$ and $R^{\beta 1}$ to $R^{\beta 8}$ each may have a substituent. Examples of the substituent include a chain or cyclic alkyl group having 1 to 20 carbon atoms (for example, a methyl group, an ethyl group, an isopropyl group or a cyclohexyl group), an aryl group having 6 to 18 carbon atoms (for example, a phenyl group, a chlorophenyl group, a 2,4-di-t-amylphenyl group, or a 1-naphthyl group), an aralkyl group having 7 to 18 carbon atoms (for example, a benzyl group or an anisyl group), an alkenyl group having 2 to 20 carbon atoms (for example, a vinyl group or a 2-methylvinyl group), an alkynyl group having 2 to 20 carbon atoms (for example, an ethynyl group, a 2-methylethynyl group, a 2-phenylethynyl group), a halogen atom (for example, F, Cl, Br, I), a cyano group, a hydroxyl group, a carboxyl group, an acyl group having 2 to 20 carbon atoms (for example, an acetyl group, a benzoyl group, a salicyloyl group or a pivaloyl group), an alkoxy group having 1 to 20 carbon atoms (for example, a methoxy group, a butoxy group, or a cyclohexyloxy group), an aryloxy group having 6 to 20 carbon atoms (for example, a phenoxy group, a 1-naphthoxy group, or a toluoyl group), an alkylthio group having 1 to 20 carbon atoms (for example, a methylthio group, a butylthio group, a benzylthio group, or a 3-methoxypropylthio group), an arylthio group having 6 to 20 carbon atoms (for example, a phenylthio group or a 4-chlorophenylthio group), an alkylsulfonyl group having 1 to 20 carbon atoms (for example, a methanesulfonyl group or a butanesulfonyl group), an arylsulfonyl group having 6 to 20 carbon atoms (for example, a benzenesulfonyl group or a paratoluene sulfonyl group), a carbamoyl group having 1 to 17 carbon atoms (for example, an unsubstituted carbamoyl group, a methyl carbamoyl group, an ethyl carbamoyl group, an n-butyl carbamoyl group, or a dimethyl carbamoyl group), an amide group having 1 to 16 carbon atoms (for example, an acetoamide group or a benzamide group), an acyloxy group having 2 to 10 carbon atoms (for example, an acetoxy group or a benzoyloxy group), an alkoxycarbonyl group having 2 to 10 carbon atoms (for example, a methoxy carbonyl group or an ethoxy carbonyl group), a five- or six-membered heterocyclic group (for example, an aromatic heterocyclic group such as a pyridyl group, a thienyl group, a furyl group, a thiazolyl group, an imidazolyl group, or a pyrazolyl group; or a heterocyclic group such as a pyrrolidinyl group, a piperidinyl group, a morpholino group, a pyranyl group, a thiopyranyl group, a dioxanyl group, or a dithiolanyl group).

In general formula (I), preferable examples of the substituent in $R^{\alpha 1}$ to $R^{\alpha 8}$ and $R^{\beta 1}$ to $R^{\beta 8}$ are a chain or cyclic alkyl group having 1 to 16 carbon atoms, an aryl group having 6 to 14 carbon atoms, an aralkyl group having 7 to 15 carbon atoms, an alkoxy group having 1 to 16 carbon atoms, an aryloxy group having 6 to 14 carbon atoms, a halogen atom, an alkoxycarbonyl group having 2 to 17 carbon atoms, a carbamoyl group having 1 to 10 carbon atoms, and an amide group having 1 to 10 carbon atoms. More preferable examples are a chain or cyclic alkyl group having 1 to 10 carbon atoms, an aralkyl group having 7 to 13 carbon atoms, an aryl group having 6 to 10 carbon atoms, an alkoxy group having 1 to 10 carbon atoms, an aryloxy group having 6 to 10 carbon atoms, chlorine atom, an alkoxycarbonyl group having 2 to 11 carbon atoms, a carbamoyl group having 1 to 7 carbon atoms, and an amide group having 1 to 8 carbon atoms.

Particularly preferable examples are a branched chain or cyclic alkyl group having 1 to 8 carbon atoms, an aralkyl group having 7 to 11 carbon atoms, an alkoxy group having 1 to 8 carbon atoms, an alkoxycarbonyl group having 3 to 9 carbon atoms, a phenyl group, and a chlorine atom. The most preferable example is an alkoxy group having 1 to 6 carbon atoms.

In general formula (I), M is preferably metal, more preferably zinc, magnesium, copper, nickel, or palladium, even more preferably copper or nickel, and most preferably copper.

In order to improve C/N (carrier/noise) ratio, which is an important property of the recording material, the molecular weight of the compound represented by general formula (I) is preferably 1300 or less, and more preferably 1200 or less. Further, it is particularly preferable that the substituent represented by $R^{\alpha 1}$, $R^{\alpha 2}$, $R^{\alpha 3}$, $R^{\alpha 4}$, $R^{\alpha 5}$, $R^{\alpha 6}$, $R^{\alpha 7}$, or $R^{\alpha 8}$ sulfamoyl group, an alkylsulfonyl group, arylsulfonyl group or an aralkylsulfonyl group. Furthermore, four of the substituents, namely, $R^{\alpha 1}$ or $R^{\alpha 2}$, $R^{\alpha 3}$ or $R^{\alpha 4}$, $R^{\alpha 5}$ or $R^{\alpha 6}$, and $R^{\alpha 7}$ or $R^{\alpha 8}$, are preferably the same alkylsulfonyl groups or the same arylsulfonyl groups.

The compounds represented by general formula (I) may be bonded at any positions to form a polymer. In this case, each unit may be the same or mutually different, or may bond to a polymer chain such as polystyrene, polymethacrylate, polyvinyl alcohol, or cellulose.

The phthalocyanine derivative represented by general formula (I) and used in the medium of the invention may be a specific derivative used singly or a mixture of several derivatives having different structures. In order to prevent crystallization of the recording layer, it is preferable to use a mixture of isomers whose substituents have different substitution positions.

The recording layer of the medium absorbs energy of the laser used in recording and undergoes chemical or physical decomposition, whereby recording marks (pits) are formed in the recording layer. The pits are detected by differences in reflectance at the time of playback. An extinction coefficient (k) is an optical property relating to the amount of light energy absorbed. It is not only associated with the amount of energy of the laser light absorbed during recording by the recording layer, but is also concerned with reflectance detected at the time of recording/playback. A refractive index (n) relates to optical magnitude (the amount of change in reflection characteristics) of the recording marks. Since the output of the laser light used for recording actually ranges from several mW to tens of mW, preferable ranges of the extinction coefficient (k) and refractive index (n) exist in correspondence to the basic skeleton of the compounds used in the recording layer.

In the case of the recording medium of the invention, the refractive index (n) and extinction coefficient (k) of the recording layer containing the compounds represented by general formula (I) are preferably respectively in a range of $1.0<n<1.9$ and in a range of $0.03<k<0.30$ with respect to the wavelength of the laser used for recording, and more preferably respectively in a range of $1.5<n<1.9$ and in a range of $0.04<k<0.15$. The refractive index (n) and the extinction coefficient (k) can easily be measured by ellipsometry.

While specifically preferable examples of the phthalocyanine derivative used in the invention are shown in Tables 1 to 3 below, the present invention is not limited to these examples.

In Tables 1 to 3, $R^x/R^y$ (each of x and y represents either one of $\alpha 1$ to $\alpha 8$ or $\beta 1$ to $\beta 8$) means either one of $R^x$ or $R^y$. Accordingly, compounds indicated thereby are mixtures of substitution position isomers. In the case of unsubstituted compounds, i.e. the compounds substitute hydrogen atoms, the representation is omitted.

TABLE 1

| No. | Substitution Positions and Substituents | M |
|---|---|---|
| (I-1) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$N(C$_5$H$_{11}$-i)$_2$ | Cu |
| (I-2) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$NH(2-s-butoxy-5-t-amylphenyl) | Cu |
| (I-3) | $R^{\alpha 1}/R^{\alpha 2}$, $R^{\alpha 3}/R^{\alpha 4}$, $R^{\alpha 5}/R^{\alpha 6}$ —SO$_2$NH(CH$_2$)$_3$O(2,4-di-t-amyl-phenyl) $R^{\alpha 7}/R^{\alpha 8}$—SO$_3$H | Cu |
| (I-4) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$N(3-methoxypropyl)$_2$ | Ni |

TABLE 1-continued

| No. | Substitution Positions and Substituents | M |
|---|---|---|
| (I-5) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$NMe(cyclohexyl) | Ni |
| (I-6) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$N(3-i-propoxyphenyl)$_2$ | Ni |
| (I-7) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$NH(2-i-amyloxy-carbonylphenyl) | Pd |
| (I-8) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$NH(2,4,6-trimethyl-phenyl) | Pd |
| (I-9) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$(4-morpholino) | Co |
| (I-10) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$N(C$_2$H$_5$)(4-fluorophenyl) | Fe |
| (I-11) | $R^{\alpha1}/R^{\alpha2}$, $R^{\alpha3}/R^{\alpha4}$, $R^{\alpha5}/R^{\alpha6}$ —SO$_2$NH(CH$_2$)$_3$N(C$_2$H$_5$)$_2$ | Cu |
| (I-12) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$(2-n-propoxyphenyl) | Cu |
| (I-13) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$(2-n-butoxy-5-t-butyl-phenyl) | Ni |
| (I-14) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$(2-methoxycarbonyl-phenyl) | Co |

TABLE 2

| No. | Substitution Positions and Substituents | M |
|---|---|---|
| (I-15) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$(CH$_2$)$_4$O(2-chloro-4-t-amylphenyl) | Cu |
| (I-16) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$(CH$_2$)$_2$CO$_2$C$_4$H$_9$-i | Pd |
| (I-17) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$(cyclohexyl) | Cu |
| (I-18) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$ {4-(2-s-butoxy-benzoylamino)phenyl} | Ni |
| (I-19) | $R^{\alpha1}/R^{\alpha2}$, $R^{\alpha3}/R^{\alpha4}$, $R^{\alpha5}/R^{\alpha6}$ —SO$_2$(2,6-dichloro-4-methoxyphenyl) | Pd |
| (I-20) | $R^{\alpha1}/R^{\alpha2}$, $R^{\alpha3}/R^{\alpha4}$, $R^{\alpha5}/R^{\alpha6}$ —SO$_2$CH(Me) CO$_2$CH$_2$-CH(C$_2$H$_5$) C$_4$H$_9$-n | Mg |
| (I-21) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$ {2-(2-ethoxyethoxy)-phenyl} $R^{\beta1}/R^{\beta2}$, $R^{\beta3}/R^{\beta4}$, $R^{\beta5}/R^{\beta6}$, $R^{\beta7}/R^{\beta8}$ —C$_2$H$_5$ | Zn |
| (I-22) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$N(CH$_2$CH$_2$OMe)$_2$ | Cu |
| (I-23) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ -OCH$_2$CH(C$_2$H$_5$) C$_4$H$_9$-n | Ni |
| (I-24) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —OCHMe(phenyl) | Zn |
| (I-25) | $R^{\alpha1}$, $R^{\alpha2}$, $R^{\alpha3}$, $R^{\alpha4}$, $R^{\alpha5}$, $R^{\alpha6}$, $R^{\alpha7}$, $R^{\alpha8}$ —OCH(s-butyl)$_2$ | Cu |
| (I-26) | $R^{\alpha1}$, $R^{\alpha2}$, $R^{\alpha3}$, $R^{\alpha4}$, $R^{\alpha5}$, $R^{\alpha6}$, $R^{\alpha7}$, $R^{\alpha8}$ —OCH$_2$CH$_2$OC$_3$H$_7$-i | SiCl$_2$ |
| (I-27) | $R^{\alpha1}/R^{\alpha2}$, $R^{\alpha3}/R^{\alpha4}$, $R^{\alpha5}/R^{\alpha6}$, $R^{\alpha7}/R^{\alpha8}$-t-amyl $R^{\beta1}/R^{\beta2}$, $R^{\beta3}/R^{\beta4}$, $R^{\beta5}/R^{\beta6}$, $R^{\beta7}/R^{\beta8}$-Cl | Ni |

TABLE 3

| No. | Substitution Positions and Substituents | M |
|---|---|---|
| (I-28) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ -(2,6-di-ethoxyphenyl) | Zn |
| (I-29) | $R^{\alpha1}/R^{\alpha2}$, $R^{\alpha3}/R^{\alpha4}$, $R^{\alpha5}/R^{\alpha6}$ —SO$_2$NHCH$_2$CH$_2$OC$_3$H$_7$-i $R^{\alpha7}/R^{\alpha8}$—SO$_3$H | Cu |
| (I-30) | $R^{\alpha1}/R^{\alpha2}$, $R^{\alpha3}/R^{\alpha4}$, $R^{\alpha5}/R^{\alpha6}$ —CO$_2$CH$_2$CH$_2$OC$_2$H$_6$ $R^{\alpha7}/R^{\alpha8}$-CO$_2$H | Cu |
| (I-31) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —CO$_2$CH(Me) CO$_2$C$_3$H$_7$-i | Co |
| (I-32) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —CONHCH$_2$CH$_2$OC$_3$H$_7$-i | Cu |
| (I-33) | $R^{\alpha1}/R^{\alpha2}$, $R^{\alpha3}/R^{\alpha4}$, $R^{\alpha5}/R^{\alpha6}$ —CON(CH$_2$CH$_2$OC$_4$H$_9$-n)$_2$ $R^{\alpha7}/R^{\alpha8}$-CO$_2$H | Pd |
| (I-34) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —NHCOCH(C$_2$H$_5$) C$_4$H$_9$-n | Co |
| (I-35) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —NHCO(2-n-butoxycarbonyl-phenyl) | Mg |
| (I-36) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —NHSO$_2$(2-i-propoxyphenyl) | Pd |
| (I-37) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —NHSO$_2$(2-n-butoxy-5-t-amyl-phenyl) | Zn |
| (I-38) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$CH$_3$ | Ni |
| (I-39) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$CH(CH$_3$)$_2$ | Cu |
| (I-40) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$C$_4$H$_9$-s | Cu |
| (I-41) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$CH$_2$CO$_2$CH(CH$_3$)$_2$ | Zn |
| (I-42) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$CH(CH$_3$) CO$_2$CH$_3$ | Cu |
| (I-43) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$C$_6$H$_5$ | Cu |
| (I-44) | $R^{\beta1}/R^{\beta2}$, $R^{\beta3}/R^{\beta4}$, $R^{\beta5}/R^{\beta6}$, $R^{\beta7}/R^{\beta8}$ —SO$_2$N(C$_5$H$_{11}$-i)$_2$ | Cu |
| (I-45) | $R^{\beta1}/R^{\beta2}$, $R^{\beta3}/R^{\beta4}$, $R^{\beta5}/R^{\beta6}$, $R^{\beta7}/R^{\beta8}$ —SO$_2$CH(CH$_3$)$_2$ | Cu |
| (I-46) | $R^{\alpha1}/R^{\alpha2}$, $R^{\alpha3}/R^{\alpha4}$, $R^{\alpha5}/R^{\alpha6}$, $R^{\alpha7}/R^{\alpha8}$ —SO$_2$CH$_2$C$_6$H$_5$ | Cu |

The phthalocyanine derivative used in the present invention can be synthesized by the methods described in *Putaroshianin: Kagaku to kinô* ("Phthalocyanines: Chemistry and Function"), ed. by H. Shirai and N. Kobayashi (Tokyo: IPC Co., Ltd., 1997), pp. 1-62, and in *Phthalocyanines: Properties and Applications*, ed. by C. C. Leznoff and A. B. P. Lever (VCH Publishers: New York, 1989, 1993), pp. 1-54, or by a similar method.

As mentioned above, the medium of the invention comprises a substrate having disposed thereon a recording layer containing the above-mentioned phthalocyanine derivative. The content of the phthalocyanine derivative is preferably 80% by weight or more, and more preferably 90% by weight or more, in the recording layer. If the content is less than 80% by weight, the refractive index with respect to the laser light decreases, and as a result the percentage modulation may decrease.

The medium of the invention may preferably comprise a disc substrate having successively disposed thereon the recording layer, a reflective layer, and a protective layer, with a pre-groove having a fixed track pitch being formed in the substrate. The medium may also preferably comprise a disc substrate having successively disposed thereon the reflective layer, a recording layer, and a protective layer. Moreover, the medium may also preferably comprise two transparent disc substrates, each of which includes a pre-groove having a fixed track pitch and is disposed with the recording layer and a reflective layer, adhered together so that the recording layers face inward.

Description will now be given of an example in which the medium comprises a disc substrate having successively disposed thereon the recording layer, a reflective layer, and a protective layer. The medium will be described in accordance with the process by which it is manufactured.

The medium of the invention may be formed in a manner similar to a conventional DVD-R, in which two transparent disc substrates, each of which includes a pre-groove having a fixed track pitch and is disposed with the recording layer and a reflective layer, are adhered together so that the recording layers face inward. The medium of the invention may also be formed by this layered product being adhered to a disc-shaped protective substrate having the same configuration as the layered product, with the recording layer facing inward. When two substrates are bonded to form the medium, the transparent substrate has a diameter of 120±3 mm and a thickness of 0.6±0.1 mm, with the thickness of the medium after bonding being adjusted to 1.2±0.2 mm. The substrates may be bonded with a UV-curable resin used to form the protective layer or with a synthetic binder. A double-coated tape may be also used.

The medium of the invention may comprise a disc substrate that includes a pre-groove having a fixed track pitch and is successively disposed with a reflective layer, a recording layer, and a thin film protective layer. In this medium, the thin film protective layer is disposed on an opposite side of the substrate, which has a predetermined thickness (in the case of a CD-R, 1.2 mm). The medium is recorded by irradiating a light from the side of the substrate disposed with the thin film protective layer, whereby the beam diameter of the irradiated laser can be made smaller and it is possible to effect high density recording with light having a short wavelength of 450 nm or less.

The thin-film protective layer preferably has a thickness of 0.1 to 300 μm, and is made of a photoresist or a filmlike resin. It should be noted that the thin film protective layer may be disposed on the recording layer via an intermediate layer or an adhesive layer. The intermediate layer is disposed to enhance preservability of the recording layer and to enhance adhesion between the recording layer and the thin-film protective layer. Examples of material used for the intermediate layer include inorganic materials such as $ZnS$—$SiO_2$, $ZnS$, $SiO$, $SiO_2$, $MgF_2$, $SnO_2$, or $Si_3N_4$. The intermediate layer can be formed by vacuum formation, such as deposition or sputtering. For the adhesive layer, it is preferable to use an adhesive containing a photoresist. The photoresist can be used as it is or be dissolved into a solvent to make a coating solution. In the latter case, the solution is coated onto the intermediate layer to make a coating film, and then a resin film obtained by extruding plastic is laminated on the coating film. Light is irradiated onto the laminated resin film, whereby the coating film is cured and the resin film is adhered onto the intermediate layer to form the thin film protective layer.

In the medium of the invention, it is possible to use a substrate that includes a pre-groove whose track pitch is narrower than that of a CD-R or DVD-R in order to achieve even higher recording density. The track pitch is preferably 0.2 to 0.8 μm, more preferably 0.2 to 0.5 μm, and most preferably 0.2 to 0.4 μm.

The depth of the pre-groove is preferably 0.01 to 0.18 μm and more preferably 0.02 to 0.15 μm.

Materials for the substrate can be arbitrarily selected from various kinds of materials that are used as for substrates in conventional optical information recording media. Examples thereof include glass, polycarbonate, acrylic resins such as polymethyl methacrylate, polyvinylchloride resins such as polyvinyl chloride and vinylchloride copolymer, epoxy resin, amorphous polyolefin, and polyester. If necessary, these materials may be used in combination. These materials can be used in the form of a film or a substrate that has rigidity. Polycarbonate is preferable in view of resistance to moisture, dimensional stability, and cost.

An undercoat layer may be provided on the surface of the substrate on which the recording layer is disposed in order to improve flatness, enhance adhesive force, and prevent degeneration of the recording layer. Examples of materials for the undercoat layer include: polymeric substances, such as polymethyl methacrylate, acrylic acid/methacrylic acid copolymer, styrene/maleic anhydride copolymer, polyvinyl alcohol, N-methylol acrylamide, styrene/vinyl toluene copolymer, chlorosulfonated polyethylene, nitrocellulose, polyvinyl chloride, chlorinated polyolefin, polyester, polyimide, vinylacetate/vinylchloride copolymer, ethylene/vinylacetate copolymer, polyethylene, polypropylene, and polycarbonate; and surface modifiers, such as a silane coupling agent. The undercoat layer can be formed by dissolving or dispersing the above-mentioned material into a suitable solvent to prepare a coating solution, and then spin-coating, dip-coating, or extrusion-coating the solution onto the surface of the substrate. The thickness of the undercoat layer is generally 0.005 to 20 μm and preferably 0.01 to 10 μm.

The recording layer can be formed by deposition, sputtering, CVD, or coating a solvent, but coating a solvent is preferable. In this case, a coating solution is prepared by dissolving the above-mentioned dye compound and, if necessary, a quencher, a binder and the like, in a solvent. The solution is then coated onto the surface of the substrate and dried to form a coating film. Examples of the solvent for the coating solution include: esters, such as butyl acetate, ethyl lactate, and cellosolve acetate; ketones, such as methyl ethyl ketone, cyclohexanone, and methyl isobutyl ketone; chlorinated hydrocarbons, such as dichloroethane, 1,2-dichloroethane, and chloroform; amides, such as dimethylformamide; hydrocarbons, such as methyl cyclohexane; ethers, such as dibutyl ether, diethyl ether, tetrahydrofuran, and dioxane; alcohols, such as ethanol, n-propanol, isopropanol, n-butanol, and diacetone alcohol; fluorine solvents, such as 2,2,3,3-tetrafluoropropanol; and glycolethers, such as ethylene glycol monomethyl ether, ethylene glycol monoethyl ether, and propylene glycol monomethyl ether. These solvents can be used singly or in combination of two or more, with consideration given to the solubility of the dye used. Various additives can also be added to the coating solution as needed, such as antioxidants, UV absorbents, plasticizers, and lubricants.

When a binder is used, examples thereof can include: natural organic polymeric substances, such as gelatin, cellulose derivatives, dextran, rosin, or rubber; and synthetic organic polymeric substances, such as hydrocarbon resins like polyethylene, polypropylene, polystyrene, and polyisobutylene, vinyl resins like polyvinyl chloride, polyvinylidene chloride, and polyvinyl chloride/polyvinyl acetate copolymer, acrylic resins like polymethyl acrylate and methyl polymethacrylate, and initial condensation products of thermosetting resins like polyvinyl alcohol, chlorinated polyethylene, epoxy resin, butyral resin, rubber derivative, and phenol/formaldehyde resin. When a binder is included in the recording layer, the amount of the binder is generally 0.01 to 50 times (weight ratio), and preferably 0.1 to 5 times (weight ratio), the amount of the dye (phthalocyanine derivative). The concentration of the dye in the coating solution is generally 0.01 to 10% by weight and preferably 0.1 to 5% by weight.

The solvent can be sprayed, spin-coated, dipped, roll-coated, blade-coated, doctor-rolled, or screen-printed onto the substrate. The recording layer may comprise a single or multiple layers. The thickness of the recording layer is generally 10 to 500 nm, preferably 15 to 300 nm, and more preferably 20 to 100 nm.

In order to enhance recording characteristics by controlling the thermal decomposition of the recording layer when the recording layer is irradiated with the laser, various agents for controlling thermal decomposition can be added to the recording layer. For example, European Patent No. 0600427 discloses adding metal complexes, which is effective. Among the metal complexes, a metallocene derivative is preferable, and a ferrocene derivative is more preferable.

The recording layer can contain various discoloration inhibitors in order to enhance light resistance of the recording layer. Generally, a singlet oxygen quencher is used as the discoloration inhibitor. Examples of the singlet oxygen quencher include those described in patent publications such as JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, and 4-25492, Japanese Patent Application Publication Nos. 1-38680 and 6-26028, German Patent No. 350399, and in other publications such as *Nihon kagaku-kaishi*, October 1992, pp. 1141. Other preferable examples of the singlet oxygen quencher include the compounds represented by the following general formula (II).

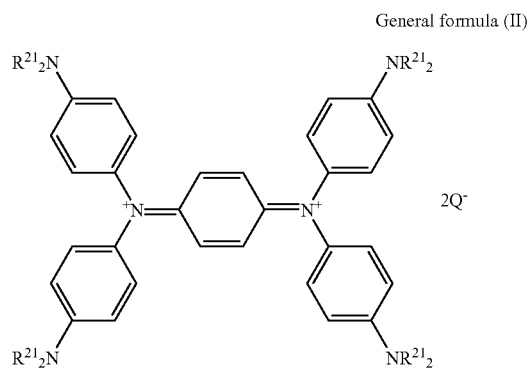

General formula (II)

wherein $R^{21}$ represents an alkyl group that may have a substituent and $Q^-$ represents an anion.

In general formula (II), $R^{21}$ is generally an alkyl group having 1 to 8 carbon atoms and may have a substituent, and preferably an unsubstituted alkyl group having 1 to 6 carbon atoms. Examples of the substituent for the alkyl group include a halogen atom (for example, F and Cl), an alkoxy group (for example, methoxy and ethoxy), an alkylthio group (for example, methylthio and ethylthio), an acyl group (for example, acetyl and propyonyl), an acyloxy group (for example, acetoxy and propionyloxy), a hydroxy group, an alkoxy carbonyl group (for example, methoxy carbonyl and ethoxycarbonyl), an alkenyl group (for example, vinyl), and an aryl group (for example, phenyl and naphthyl). A halogen atom, an alkoxy group, an alkylthio group, and an alkoxy carbonyl group are preferable. Preferable examples of the $Q^-$ anion include $ClO_4^-$, $AsF_6^-$, $BF_4^-$, and $SbF_6^-$.

Examples of the compound represented by general formula (II) are shown in Table 4 below.

TABLE 4

| Compond No. | $R^{21}$ | $Q^-$ |
|---|---|---|
| II-1 | $CH_3$ | $ClO_4^-$ |
| II-2 | $C_2H_5$ | $ClO_4^-$ |
| II-3 | $C_3H_7(n)$ | $ClO_4^-$ |
| II-4 | $C_4H_9(n)$ | $ClO_4^-$ |
| II-5 | $C_5H_{11}(n)$ | $ClO_4^-$ |

TABLE 4-continued

| Compond No. | $R^{21}$ | $Q^-$ |
|---|---|---|
| II-6 | $C_4H_9(n)$ | $SbF_6^-$ |
| II-7 | $C_4H_9(n)$ | $BF_4^-$ |
| II-8 | $C_4H_9(n)$ | $AsF_6^-$ |

The amount of the discoloration inhibitor is generally 0.1 to 50% by weight, preferably 0.5 to 45% by weight, even more preferably 3 to 40% by weight, and most preferably 5 to 25% by weight with respect to the dye (the phthalocyanine derivative).

It is preferable to dispose a reflective layer adjacent to the recording layer in order to enhance reflectance at the time information is played back. The substance of the reflective layer has a high reflectance with respect to the laser, and examples thereof include metals, such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi, metalloids and stainless steel. These materials may be used singly, in combination of two or more, or as alloys. Cr, Ni, Pt, Cu, Ag, Au, Al, and stainless steel are preferable. Au, Ag, Al, or alloys of these metals are more preferable, with Ag, Al, or alloys thereof being most preferable. The reflective layer can be formed on the substrate or recording layer by deposition, sputtering, or ion-plating of the light reflective material. The thickness of the reflective layer is generally 10 to 300 nm and preferably 50 to 200 nm.

It is preferable to dispose a protective layer on the reflective layer or the recording layer in order to physically and chemically protect the recording layer. When the medium of the invention comprises a DVD-R structure (i.e., when two substrates are bonded together with the recording layers facing inward), it is not always necessary to dispose a protective layer. Examples of the material used for the protective layer include inorganic materials, such as ZnS—$SiO_2$, ZnS, SiO, $SiO_2$, $MgF_2$, $SnO_2$, and $Si_3N_4$, and organic materials, such as thermoplastic resins, thermosetting resins, and UV-curable resins. The protective layer can be formed by laminating a film obtained by extruding plastic on the reflection layer via an adhesive. Alternatively, the protective layer can be vacuum-deposited, sputtered, or coated. When the protective layer comprises a thermoplastic resin or a thermosetting resin, the protective layer can be formed by dissolving the resin into a solvent to prepare a coating solution, coating the solution, and allowing it to dry. When the protective layer comprises a UV-curable resin, the UV-curable resin can be using as it is or dissolved in a solvent to prepare a coating solution. In the latter case, the solution is coated and then irradiated with ultraviolet light to cure the resin. Various additives may be further added to these solutions as needed, such as antistatic agents, antioxidants, and UV absorbents. The thickness of the protective layer is generally 0.1 μm to 1 mm.

In this manner, a laminated product comprising either a substrate having successively formed thereon a recording layer, a reflective layer, and a protective layer, or a substrate having successively disposed thereon a reflective layer, a recording layer, and a protective layer, is formed.

EXAMPLES

The present invention will be now be described in more detail by way of examples. However, the present invention is not limited to the same.

Example 1

A compound (I-1) was dissolved into 2,2,3,3-tetrafluoropropanol to obtain a coating solution for forming a recording layer (concentration: 1% by weight). The coating solution was spin-coated onto the surface of a polycarbonate substrate (diameter: 120 nm; thickness: 0.6 mm) disposed with a spiral pre-groove (track pitch: 0.4 µm; groove width: 0.2 µm; groove depth: 0.08 µm) formed by injection molding, whereby the recording layer was formed (thickness (inside pre-groove): approximately 80 nm).

Next, silver was sputtered onto the recording layer to form a reflective layer having a thickness of approximately 100 nm. A UV-curable resin (SD 318 made by Dainippon Ink and Chemical Co., Ltd.) was then coated onto the reflective layer and cured by being irradiated with ultraviolet light, whereby a protective layer having a thickness of 7 µm was formed. Thus, an optical disc of the present invention was obtained.

Examples 2 to 17

Optical discs of the invention were formed in the same manner as in Example 1, except that compound (I-1) was changed to compounds shown in Table 6 (amount not changed).

Comparative Examples 1 to 7

Comparative optical discs were manufactured in the same manner as in Example 1, except that compound (I-1) was changed to comparative dye compounds A to G (amount not changed) shown below.

Comparative Dye Compound A (Disclosed in Examples of JP-A No. 7-304256)

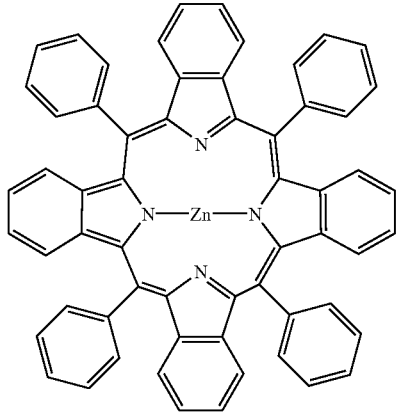

Comparative Dye Compound B (Disclosed in Example 1 of JP-A No. 8-127174)

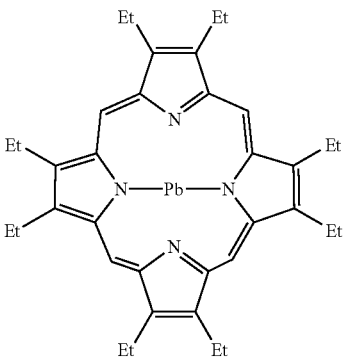

Comparative Dye Compound C (Disclosed in Example 1 of JP-A No. 11-334207)

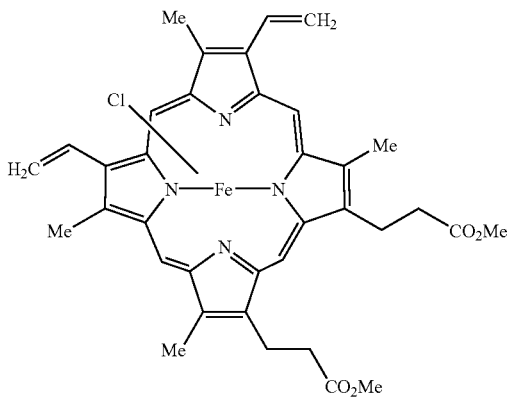

Comparative Dye Compound D (Disclosed in Examples of JP-A No. 2000-228028)

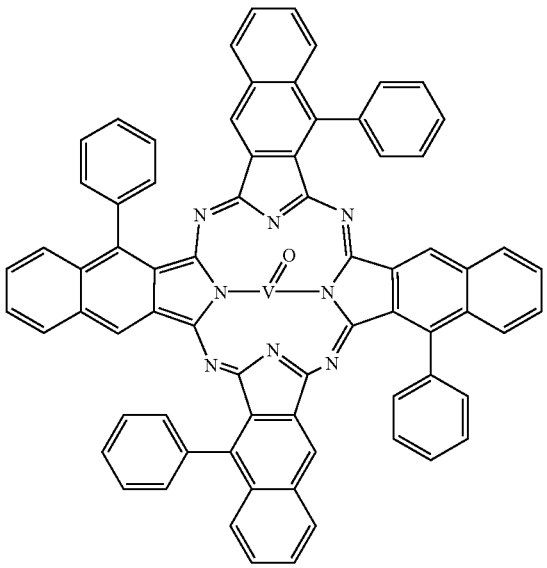

Comparative Dye Compound E (Disclosed in Example 5 of JP-A No. 2001-287465)

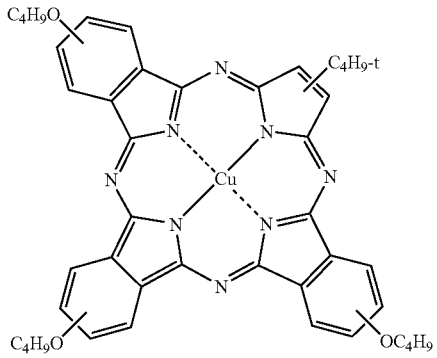

Comparative Dye Compound F (Disclosed in Example 6 of JP-A No. 2001-287465)

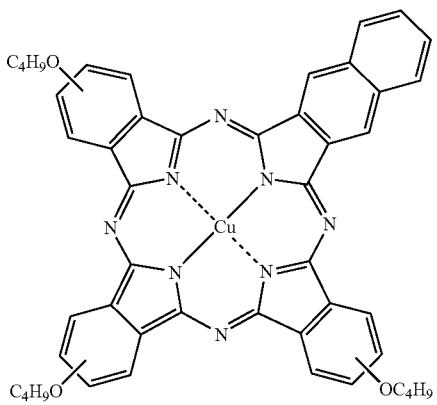

Comparative Dye Compound G (Disclosed in Example 7 of JP-A No. 2001-287465)

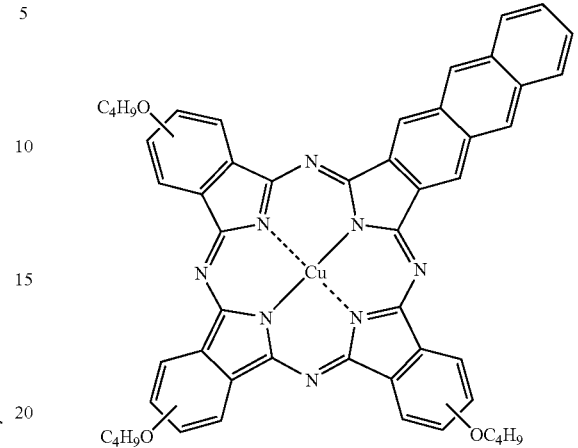

Evaluation 1 as an Optical Disc

A 14T-EFM signal was recorded using a bluish-purple semiconductor laser whose oscillation wavelength was 405 nm, at a linear velocity of 3.5 m/sec, onto each of the optical discs prepared in Examples 1 to 17 and Comparative Examples 1 to 7, and then the recorded signal was played back. Percentage modulation, C/N (Carrier/Noise Ratio) and groove reflectance were measured at an optimum power. The optical discs were then left for 100 days under forced conditions of a temperature of 80° C. and a humidity of 85%, and thereafter percentage modulation was measured to evaluate deterioration of the recorded signal. Evaluation of recording and recording characteristics was performed using a DDU1000 manufactured by Pulstec Industrial Co., Ltd. The results of the evaluation are shown in Table 5.

In Table 5, percentage modulation B is the percentage modulation before subjecting the sample optical discs to the forced conditions, while percentage modulation A is the percentage modulation after subjecting the sample optical discs to the forced conditions.

TABLE 5

| | Dye compound of the recording layer | Reflectance (%) of non-recorded portion | C/N (dB) | Pecentage modulation B (%) | Pecentage modulation A (%) |
|---|---|---|---|---|---|
| Example 1 | I-1 | 63 | 60 | 52 | 50 |
| Example 2 | I-2 | 64 | 55 | 55 | 53 |
| Example 3 | I-7 | 59 | 54 | 50 | 48 |
| Example 4 | I-11 | 58 | 59 | 49 | 48 |
| Example 5 | I-12 | 61 | 56 | 50 | 49 |
| Example 6 | I-23 | 60 | 52 | 50 | 48 |
| Example 7 | I-27 | 57 | 53 | 45 | 44 |
| Example 8 | I-28 | 52 | 53 | 47 | 42 |
| Example 9 | I-29 | 65 | 57 | 55 | 54 |
| Example 10 | I-30 | 59 | 53 | 48 | 43 |
| Example 11 | I-32 | 58 | 52 | 47 | 43 |
| Example 12 | I-34 | 60 | 52 | 48 | 45 |
| Example 13 | I-39 | 66 | 61 | 57 | 56 |
| Example 14 | I-40 | 65 | 61 | 56 | 55 |
| Example 15 | I-43 | 61 | 62 | 57 | 56 |
| Example 16 | I-44 | 60 | 51 | 50 | 48 |
| Example 17 | I-45 | 64 | 53 | 54 | 52 |

TABLE 5-continued

|  | Dye compound of the recording layer | Reflectance (%) of non-recorded portion | C/N (dB) | Pecentage modulation B (%) | Pecentage modulation A (%) |
|---|---|---|---|---|---|
| Comperative Example 1 | A | 44 | 43 | 43 | crystallized: unable to measure |
| Comperative Example 2 | B | 51 | 42 | 45 | crystallized: unable to measure |
| Comperative Example 3 | C | 48 | 43 | 45 | 15 |
| Comperative Example 4 | D | 36 | 44 | 39 | crystallized: unable to measure |
| Comperative Example 5 | E | 52 | 44 | 45 | 40 |
| Comperative Example 6 | F | 50 | 48 | 41 | crystallized: unable to measure |
| Comperative Example 7 | G | 39 | 45 | 40 | crystallized: unable to measure |

From the results of Table 5, it is apparent that the optical discs of the invention (Examples 1 to 17) disposed with the recording layer containing the phthalocyanine derivative, when compared to the comparative optical discs (Comparative Examples 1 to 7) disposed with recording layers respectively containing the comparative dye compounds A to G, provide high reflectance and high percentage modulation with respect to the bluish-purple semiconductor laser, and show less change in their percentage modulation even when subjected to the forced conditions. Accordingly, each of the optical discs that used the phthalocyanine derivative of the present invention had high recording characteristics with respect to a shortwave laser and high storability with respect to high temperatures and high humidity.

Example 18

A compound (I-3) was dissolved into dibutyl ether to obtain a coating solution for forming a recording layer (concentration: 1% by weight). The coating solution was spin-coated onto the surface a polycarbonate substrate (diameter: 120 nm; thickness: 0.6 mm) disposed with a spiral pre-groove (track pitch: 1.0 μm; groove width: 0.4 μm; groove depth: 0.15 μm) formed by injection molding, whereby the recording layer was formed (thickness (inside pre-groove): approximately 170 nm).

Next, silver was sputtered onto the recording layer to form a reflective layer having a thickness of approximately 100 nm. A UV-curable resin (SD 318 made by Dainippon Ink and Chemical Co., Ltd.) was then coated onto the reflective layer and cured by being irradiated with ultraviolet light, whereby a protective layer having a thickness of 7 μm was formed. Thus, an optical disc of the present invention was obtained.

Evaluation 2 as an Optical Disc

A 14T-EFM signal was recorded on the optical disc of Example 18 at a linear velocity of 1.4 m/sec using a semiconductor laser having an oscillation wavelength of 780 nm. The recorded signal was played back using the same semiconductor laser, and the playback signal waveform was observed. A 14T-EFM signal was recorded on the same optical disc of Example 13 at a linear velocity of 1.4 m/sec using a semiconductor laser having an oscillation wavelength of 405 nm. The recorded signal was played back using the same semiconductor laser, and the playback signal waveform was observed. As a result, when recording was performed using either of the lasers having mutually different wavelengths, equal and clear playback signal waveforms were observed. Further, when the signal recorded by the semiconductor laser having an oscillation wavelength of 780 nm was played back by a semiconductor laser having an oscillation wavelength of 405 nm, clear playback signal waveforms were observed.

According to the invention, the optical information recording method and medium of the present invention solve conventional problems, exhibit excellent recording characteristics, and are stable with respect to high temperature and high humidity, and therefore are able to preserve recorded information over a long period of time.

By using the phthalocyanine derivative as the recording material of the recording layer in the optical information recording medium of the invention, high density recording and playback of information can be effected by irradiating the medium with a laser having a short wavelength of 450 nm or less, and a generally available laser having a wavelength around 405 nm. In addition, the optical information recording medium of the invention has good recording and playback characteristics, such as high sensitivity, high reflectance, and high percentage modulation. According to the optical information recording medium of the present invention, it is possible to record information at a higher density than is the case with conventional CD-Rs and DVD-Rs, and it is thus possible to record a larger volume of information.

By using the phthalocyanine derivative as the recording material of the recording layer, information can be recorded on and played back from the optical information recording medium of the invention by both a laser having a short wavelength of 450 nm or less and a laser having a wavelength of 750 to 850 nm used for conventional CD-Rs, without using different recording materials with different wavelengths. According to the invention, a highly versatile optical information recording medium is provided.

Further, the optical information recording method of the invention enables information to be recorded by selectively irradiating the medium of the invention with either a laser having a wavelength of 450 nm or a laser having a wavelength of 750 to 850 nm.

What is claimed is:

1. An optical information recording medium used in a method of recording information by irradiating the medium with a laser having a wavelength no greater than 450 nm, wherein a recording layer of the optical information recording medium contains a phthalocyanine compound represented by Formula (I):

Formula (I):

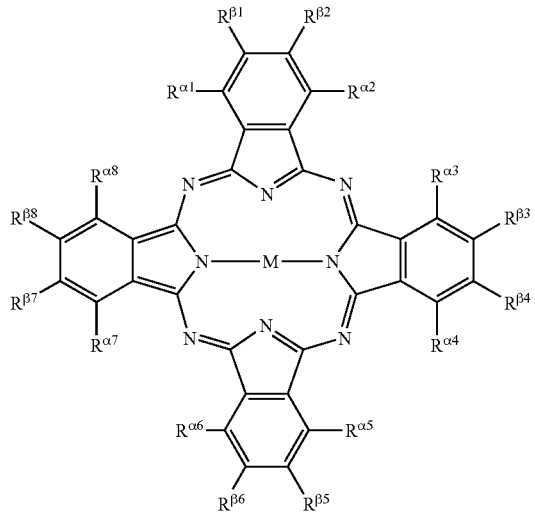

wherein $R^{\alpha 1}$ to $R^{\alpha 8}$ and $R^{\beta 1}$ to $R^{\beta 8}$ each independently represents one selected from the group consisting of a hydrogen atom, an alkylsulfonyl group having 1 to 20 carbon atoms, an arylsulfonyl group having 6 to 14 carbon atoms, and an aralkylsulfonyl group having 7 to 15 carbon atoms; and M represents a metal selected from the group consisting of zinc, magnesium, copper, nickel, and palladium and wherein at least four of the $R^{\alpha 1}$-$R^{\alpha 8}$ substituents in the Formula (I) are not simultaneously hydrogen atoms;
wherein the refractive index of the recording layer is more than 1.5 and less than 1.9 at the wavelength of laser light used in recording; and
wherein a pre-groove having a track pitch of 0.2 to 0.5 µm is formed on the surface of the substrate disposed with the recording layer of the medium.

2. The optical information recording medium of claim 1, wherein all of $R^{\beta 1}$ to $R^{\beta 8}$ in the Formula (I) are simultaneously hydrogen atoms.

3. The optical information recording medium of claim 2, wherein $R^{\alpha 1}$ or $R^{\alpha 2}$, $R^{\alpha 3}$ or $R^{\alpha 4}$, $R^{\alpha 5}$ or $R^{\alpha 6}$, and $R^{\alpha 7}$ or $R^{\alpha 8}$ are the same alkylsulfonyl groups having 1 to 10 carbon atoms.

4. The optical information recording medium of claim 3, wherein said same alkylsulfonyl groups are sec-butyl groups.

5. The optical information recording medium of claim 4, wherein M represents copper.

6. The optical information recording medium of claim 2, wherein $R^{\alpha 1}$ or $R^{\alpha 2}$, $R^{\alpha 3}$ or $R^{\alpha 4}$, $R^{\alpha 5}$ or $R^{\alpha 6}$, and $R^{\alpha 7}$ or $R^{\alpha 8}$ are the same alkylsulfonyl groups having 6 to 10 carbon atoms.

7. The optical information recording medium of claim 2, wherein $R^{\alpha 1}$ or $R^{\alpha 2}$, $R^{\alpha 3}$ or $R^{\alpha 4}$, $R^{\alpha 5}$ or $R^{\alpha 6}$, and $R^{\alpha 7}$ or $R^{\alpha 8}$ are phenylsulfonyl groups.

8. The optical information recording medium of claim 7, wherein M represents copper.

9. The optical information recording medium of claim 1, wherein the medium further comprises a reflective layer of metal formed disposed on the recording layer.

10. The optical information recording medium of claim 1, wherein the medium further comprises a protective layer disposed on the recording layer.

11. The optical information recording medium of claim 1, wherein the depth of the pre-groove is from 0.01 to 0.18 µm.

12. The optical information recording medium of claim 1, wherein the depth of the pre-groove is from 0.02 to 0.15 µm.

13. An optical information recording medium used in a method of recording information by irradiating the medium with a laser having a wavelength no greater than 450 nm, wherein a recording layer of the optical information recording medium contains a phthalocyanine compound represented by Formula (I):

Formula (I):

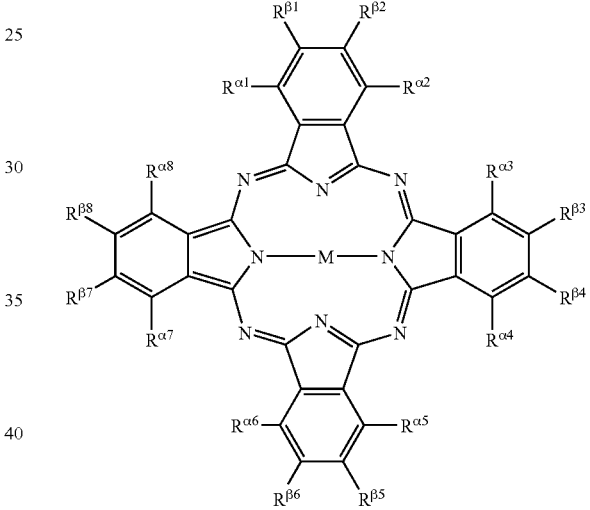

wherein $R^{\alpha 1}$ to $R^{\alpha 8}$ and $R^{\beta 1}$ to $R^{\beta 8}$ each independently represents one selected from the group consisting of a hydrogen atom, an alkylsulfonyl group having 1 to 20 carbon atoms, an arylsulfonyl group having 6 to 14 carbon atoms, and an aralkylsulfonyl group having 7 to 15 carbon atoms; and M represents two hydrogen atoms, a metal, a metal oxide, or a metal having a ligand, and wherein at least four of the substituents in the Formula (I), namely, $R^{\alpha 1}$ or $R^{\alpha 2}$, $R^{\alpha 3}$ or $R^{\alpha 4}$, $R^{\alpha 5}$ or $R^{\alpha 6}$, and $R^{\alpha 7}$ or $R^{\alpha 8}$, are not simultaneously hydrogen atoms;
wherein the refractive index of the recording layer is more than 1.5 and less than 1.9 at the wavelength of laser light used in recording and
wherein a pre-groove having a track pitch of 0.2 to 0.5 µm is formed on the surface of the substrate disposed with the recording layer of the medium.

* * * * *